A. K. WASHBURN
SPACE MEASURING INDICATOR.
APPLICATION FILED OCT. 10, 1916.
1,263,493.
Patented Apr. 23, 1918.
2 SHEETS—SHEET 2.
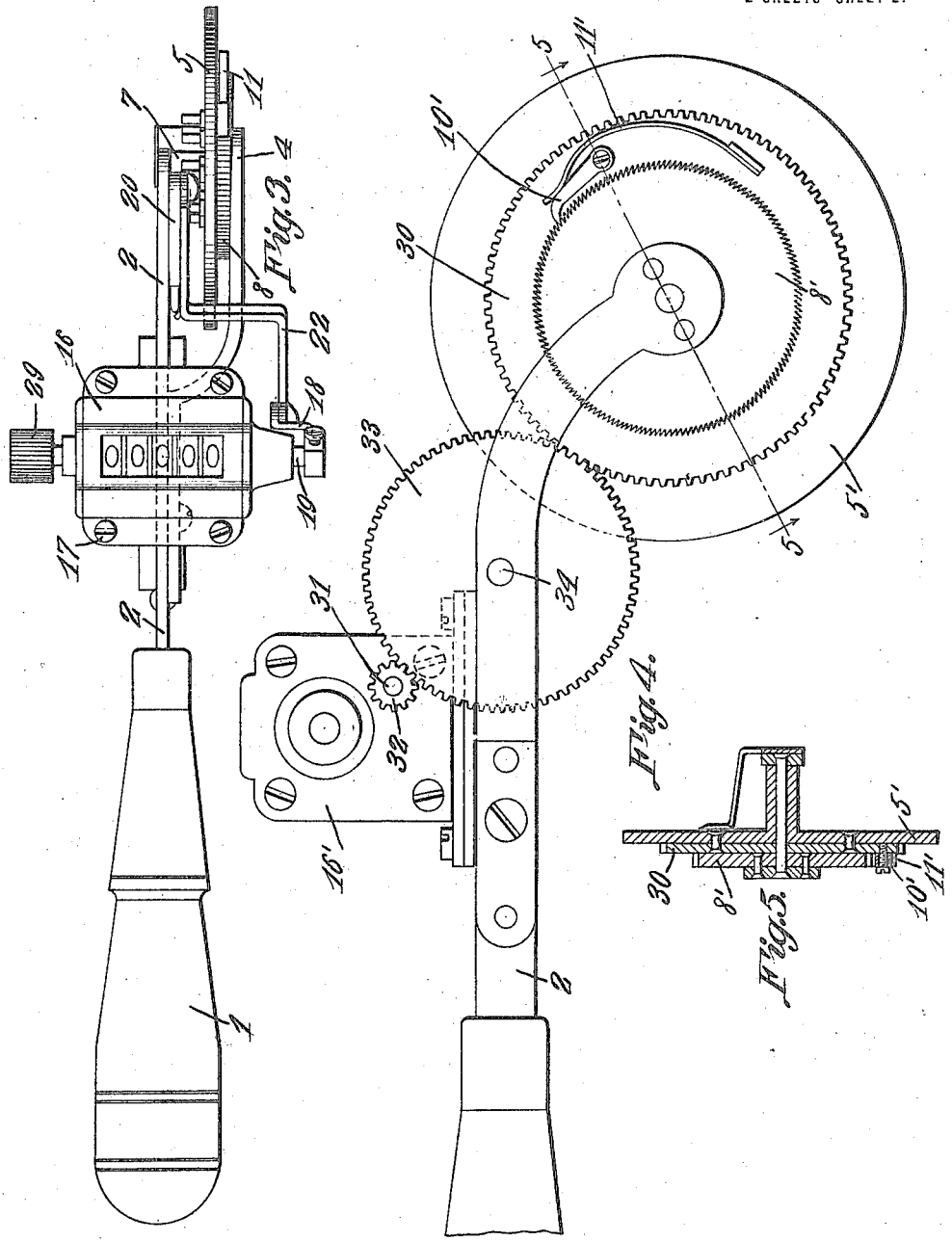
Alfred K. Washburn, INVENTOR
WITNESSES
BY
ATTORNEY

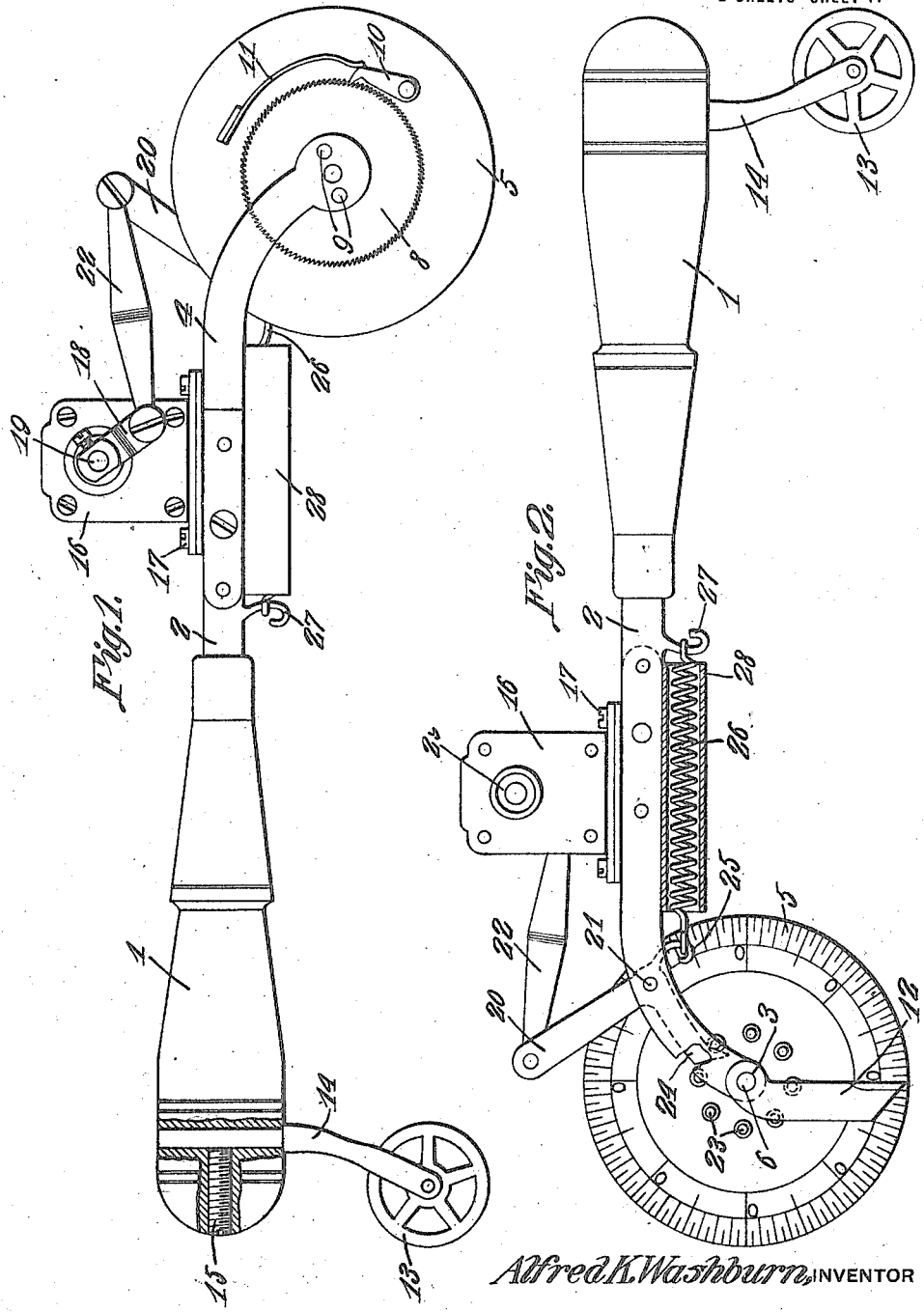

UNITED STATES PATENT OFFICE.

ALFRED K. WASHBURN, OF PROVIDENCE, RHODE ISLAND.

SPACE-MEASURING INDICATOR.

1,263,493. Specification of Letters Patent. Patented Apr. 23, 1918.

Application filed October 10, 1916. Serial No. 124,873.

*To all whom it may concern:*

Be it known that I, ALFRED K. WASHBURN, a citizen of the United States, residing at Providence, in the county of Providence and State of Rhode Island, have invented certain new and useful Improvements in Space-Measuring Indicators, of which the following is a specification.

This invention relates to an improvement in measuring indicators and particularly to devices of this character in which measurement of large and small spaces may be made, and which device at the same time adapts itself for use in taking measurement of several spaces of equal or unequal sizes and adding the total measurements together, the structure being further so arranged that measurement may be made upon any irregular line or of an irregular space.

An object of my invention is to provide a structure of the character described which is so arranged in its parts that measurement of a given space may be made or several spaces may be measured successively and the total result will be added together, and which instrument has parts thereof so arranged that exact measurement in the denominations of a recording instrument and in fractional parts of the unit of denomination of said recording instrument may be taken thus giving great accuracy in the use of the device.

A further object is to provide means by which the measurements are transferred to the recording instrument from a measuring wheel and by which the measuring wheel is held against back movement which would upset the calculations and affect the accuracy of the measurement.

A still further object lies in providing a rest wheel so arranged and mounted that the measuring wheel will be at all times disposed in the same relation upon the plane or sheet upon which the measurement is to be taken or upon any other surface against which it may be placed in use.

With the above and other objects in view, my invention consists in certain novel features of construction and combinations of parts which will be hereinafter set forth in connection with the drawings and then more particularly pointed out in the claims.

In the drawings:—

Figure 1 is a view in side elevation of one form of the device of my invention.

Fig. 2 is a view similar to Fig. 1 but taken from the opposite side of the device and with portions broken away to more clearly illustrate the operating mechanism.

Fig. 3 is a top plan view of the device.

Fig. 4 is an enlarged fragmentary view showing a modified form of carrying mechanism to the recording indicator.

Fig. 5 is a sectional view taken on the line 5—5 of Fig. 4.

The handle 1 which is shaped to give a ready and firm grasp has a stem 2 secured to extend therefrom and this stem is curved slightly at one end and is then provided with an opening 3 at the extreme end. A branch arm 4 is secured on this stem 2 in such relation that it extends to have its outer extremity spaced from and stopped substantially even with the end of the stem, it of course being understood that this branch arm 4 will necessarily have a curve equivalent to the curve of the outer extremity of the stem. A measuring wheel 5 is constructed to have the periphery thereof of a given length, and as is shown in Fig. 2, graduations and indicating markings are placed on the side of the measuring wheel to indicate the predominant division and also any fractional parts thereof which it may be desired to determine.

This measuring wheel 5 is mounted on a shaft 6 extended between the ends of the stem 2 and the branch arm 4, and as the stem and the arm are spread somewhat sufficient space to receive the measuring wheel between them is provided. A hub 7 is provided on one side of the measuring wheel which bears against the stem. Secured to the arm 4 by fastenings 9 is a ratchet wheel 8. Pivotally mounted on the wheel 5 is a pawl 10 which is resiliently retained against the ratchet wheel 8 by a spring 11 so that the measuring wheel may have revoluble movement in one direction only or only in the direction in which the pawl or dog 10 will ride over the teeth of the ratchet wheel 8.

A pointer 12 is carried by the stem 2 and is extended down to have the indicating edge thereof disposed substantially vertically beneath the center of the shaft 6, the carrying and rest wheel 13 being provided at the end of the handle to permit placing of the device at all times in the same or substantially the same relation upon a sheet or upon a plane surface. To provide adjustment for the rest wheel 13, the shank 14 by which the same is carried is extended up through a bore 13' in the handle 1 and is loosely mounted therein, the set screw 15 being provided to be tightened against the shank 14 within the bore and to thus secure the shank in various adjusted lengths of extension from the handle, in this way allowing adjustment of the height at which the handle is carried so that variation may be made if necessary to allow the measuring wheel to travel on one plane while the rest wheel travels on a lower or higher plane.

With the parts arranged as is set forth, the measuring wheel 5 may be placed upon a sheet or other surface with the pointer 12 at the location from which the measurement is to be started and then by moving the device along the length of the space or line to be measured with the measuring wheel 5 rolling, the pointer when it reaches the stopping point for the measurement will indicate the exact measurement if less than a complete revolution of the measuring wheel has been made or will permit computing of the measurement if notice has been taken of the number of turns of the measuring wheel, however, where measurements are to be taken quickly and accurately, it is desirable that some means be provided to indicate the length of the measurement in terms of the main designating markings on the measuring wheel and that only the fractional measurements be left to be read from this measuring wheel, and with this purpose in mind, I mount a counter 16, of the type of the "Veeder" counter upon the stem 2 by use of the screws 17 or other suitable means. This counting instrument has an arm 18 mounted on the operating shaft 19 thereof, and an operating lever 20 is pivotally connected on the stem 2 by means of the pin or rivet 21 and has a link 22 connected between the free end thereof and the free end of the arm 18 so that as this operating lever 20 is given reciprocatory movement the arm 18 will be oscillated to cause the proper rocking of the shaft 19 to accomplish operation of the counter. The measuring wheel 5 has the studs or pins 23 mounted to extend from one side thereof around the hub 7 and a pin is set adjacent to each of the main division markings of the gage on this measuring wheel so that the number of pins corresponds to the number of main divisions marked on the gage scale of the measuring wheel. The operating lever 20 is provided with an arm 24 which is extended substantially at right angles therefrom and is disposed to be in the path of the pins or studs 23 so that as the measuring wheel 5 is turned these pins or studs will pass under and raise the arm 24 to swing the operating lever 20 as this arm rides up over the pins or studs, this movement causing actuation of the arm 18 of the counter through the connection of the link 22. A hook or extension 25 is provided on the operating lever 20 adjacent to the mounting of the same on the pin or rivet 21 and a coil spring 26 is connected between this hook or extension 24 and a hook or extension 27 on the stem 2 so that the spring normally exerts resilient tension to move or swing the operating lever 20 forwardly to a position that the arm 24 thereof bears upon the various pins or studs 23 and that, as this arm 24 may ride over any one of the pins or studs the spring will cause return swinging movement of the operating lever to a position that the arm 24 rests against the next adjacent pin or stud. It is preferable that this spring 26 be inclosed and for this purpose I provide the tubular case 28 which is mounted on the lower side of the stem 2.

By this arrangement of the parts as is above set forth, the counter 16 may be set back through the clearing means as indicated at 29 so that it registers zero (0) and then with the measuring wheel 5 turned to a position that the pointer 12 marks one of the main divisions thereon, this measuring wheel 5 may be placed upon the sheet or plane upon which the measurement is to be taken and with the rest wheel 13 brought down to a bearing position the device may be moved forward through grasping the handle 1 and as the measuring wheel 5 turns the various pins or lugs 23 will cause the operating lever 20 to be rocked which will register the passing of each of the lugs or pins and will consequently record and indicate the number of main measuring units of the measuring wheel which have traversed the space to be measured, and when the other extremity of the space has been reached, the wheel will be brought over sufficiently that the pointer 12 points directly to the measurement and then by noting the indication as given by the counter and the fractional part as shown by the pointer, which is the fractional part of a main division past the last division mark which has just traveled beyond the pointer, the exact measurement in inches or other units of denominations which may be selected for recording by the counter and the exact fractional part can be determined, thus making it possible to obtain a quick and accurate measurement.

In Figs. 4 and 5 I have shown a slightly modified form of carrying mechanism for imparting movement to the counter or the recording indicator, and as is here shown, the parts 18 to 28 inclusive as have been hereinbefore described will be dispensed with. In this modified form of the construction, the measuring wheel 5' has a gear wheel 30 fixed thereon and this gear wheel carries the ratchet pawl or dog 10' which is held by the spring 11' in such a relation that it bears against the teeth of the ratchet wheel 8', the measuring wheel 5' being thus permitted to have free turning movement in one direction and held against return movement in the opposite direction, it of course being understood that the ratchet pawl will exert sufficient frictional engagement against the teeth of the ratchet that the measuring wheel will be held against casual movement. The counter 16' has an operating shaft 31 extended through the side thereof and a pinion 32 is mounted on this operating shaft to mesh with an intermediate gear 33 which is journaled on the shaft 34 carried by the stem 2' in such a relation that this intermediate wheel 33 will mesh with the teeth of the gear wheel 30 as well as the teeth of the pinion 32. It will of course be understood that the proportion of the gears or toothed wheels 30, 32 and 33 will be so arranged that the proper carrying action and operation of the counter will be accomplished, and it will of course be seen that the device will operate after substantially the same manner as has been set forth in connection with the preferred form, although with the carrying mechanism as illustrated in Figs. 4 and 5, it would be possible to use a more complicated form of counter and to have the same register not only the full units of measure but also the fractional part.

From the foregoing it will be seen that I have provided a space measuring indicator which is so constructed that it may be used in a number of adaptations and which has the parts thereof so arranged that the device may be used to make a number of measurements and will add the same together or may be cleared previous to the taking of each new measurement, thus making it possible to very quickly arrive at a total dimension representing a number of separate spaces or to measure the separate spaces individually and to secure indication of the measurement of each with facility.

While in the foregoing I have shown and described only specific forms of the device, it will be understood that a number of variations and modifications might be resorted to in the form and arrangement of the several parts of my structure without departing from the spirit and scope of my invention, and hence I do not wish to be limited to the exact disclosure but rather only to such points as may be included by the limitations in the claims.

I claim:

1. A space measuring indicator comprising a handle having a stem extending therefrom, a measuring wheel mounted on said stem to be capable of turning movement and provided at its peripheral edge with indicating markings given in units of measurement and fractional parts thereof, a registering and indicating means mounted on the stem, an operating lever mounted on the stem to be capable of swinging movement, a link connected between said operating lever and operating parts of the indicating and registering means, said operating lever being provided with an outstanding arm, and pins or lugs carried by said measuring wheel at points corresponding to the location of the unit markings thereof to engage with the arm of the operating lever and cause swinging movement of the same to actuate the measuring and indicating means.

2. A space measuring indicator comprising a handle having a stem extending therefrom, a measuring wheel mounted on said stem to be capable of turning movement and provided at its peripheral edge with indicating markings given in units of measurement and fractional parts thereof, a registering and indicating means mounted on the stem, an operating lever mounted on the stem to be capable of swinging movement, a link connected at one end to said operating lever and at its other end to the indicating and registering means, said operating lever being provided with an outstanding arm, pins or lugs carried by said measuring wheel at points corresponding to the location of the unit markings thereof to engage with the arm of the operating lever and cause swinging movement of the same to actuate the measuring and indicating means, and a pointer connected with said stem having its pointing end disposed adjacent to the peripheral edge of the measuring wheel to thus give indication of the fractional part of the various measuring units which will not be registered by the registering and indicating means.

3. A space measuring indicator comprising a handle having a stem extending therefrom, a measuring wheel mounted on said stem to be capable of turning movement and provided at its peripheral edge with indicating markings given in units of measurement and fractional parts thereof, a registering and indicating means mounted on the stem, an operating lever mounted on the stem to be capable of swinging movement, a link connected at one end to said operating lever and at its other end to the indicating and registering means, said operating lever being provided with an outstanding arm, pins or lugs carried by said measuring wheel at points corresponding to the location of the unit markings thereof to engage with the arm of the operating lever and cause swinging movement of the same to actuate the measuring and indicating means, a pointer connected with said stem having its pointing end disposed adjacent to the peripheral edge of the measuring wheel to thus give indication of the fractional part of the various measuring units which will not be registered by the registering and indicating means, and a spring connected with the stem and operating lever to cause return swinging movement thereof following movement by engagement with one of the pins.

4. A space measuring indicator comprising a handle having a stem extending therefrom, a measuring wheel mounted on said stem to be capable of turning movement and provided at its peripheral edge with indicating markings given in units of measurement and fractional parts thereof, a registering and indicating means mounted on the stem, an operating lever mounted on the stem to be capable of swinging movement, a link connected at one end to said operating lever and at its other end to the indicating and registering means, said operating lever being provided with an outstanding arm, pins carried by said measuring wheel at points corresponding to the location of the unit markings thereof to engage with the arm of the operating lever and cause swinging movement of the same to actuate the measuring and indicating means, a pointer connected with said stem having its pointing end disposed adjacent to the peripheral edge of the measuring wheel to thus give indication of the fractional part of the various measuring units which will not be registered by the registering and indicating means, a spring connected with the stem and a part of the operating lever to cause return swinging movement thereof following movement by engagement with one of the pins and a second wheel carried by the handle.

5. A space measuring indicator comprising a handle having a stem extending therefrom, a measuring wheel mounted on said stem capable of turning movement and provided at its peripheral edge with indicating markings given in units of measurement and fractional parts thereof, a registering and indicating means mounted on the stem, an operating lever mounted on the stem to be capable of swinging movement, a link connected at one end to said operating lever and at its other end to the indicating and registering means, said operating lever being provided with an outstanding arm, pins carried by said measuring wheel at points corresponding to the location of the unit markings thereof to engage with the arm of the operating lever and cause swinging movement of the same to actuate the measuring and indicating means, a pointer connected with said stem having its pointing end disposed adjacent to the peripheral edge of the measuring wheel to thus give indication of the fractional part of the various measuring units which will not be registered by the registering and indicating means, a spring connected with the stem and the operating lever to cause return swinging movement thereof following movement by engagement with one of the pins, a second wheel carried by the handle, and means for adjustably holding the latter wheel to give slight variation to the elevation of the handle.

6. In a measuring instrument, a handle, a disk rotatably supported thereon and adapted to traverse the area to be measured, a recording mechanism mounted on the handle, spaced pins carried by the disk, a pivoted lever operatively connected with the recording mechanism and adapted to be engaged by the pins and oscillated thereby to actuate the recording mechanism.

7. In a measuring instrument, a handle, a disk rotatably mounted thereon, a circular series of spaced pins projecting from the disk, a bell-crank lever pivotally mounted on the handle, a recording mechanism also mounted on the handle, a link operatively connected with the recording mechanism and the bell-crank lever, and resilient means urging the bell-crank lever to a position where it will be engaged by the pins.

8. In a measuring instrument, a pair of bearing arms, a disk rotatably supported by the same, a ratchet wheel rigid with one of the arms, a pivoted pawl carried by the disk and engaged with the ratchet wheel to retain the disk against rotation in one direction, a recording mechanism supported adjacent the disk, and means operatively connected with the recording mechanism for actuating the same and operated by the rotation of the disk.

9. A measuring instrument including a handle, a stem carried by one end of said handle, a recorder mounted on said stem and including a casing having an operating shaft extending therefrom, a graduated traction wheel rotatably secured to said stem and spaced from said casing and an operative driving connection between the rotatable wheel and the shaft projecting from said casing.

10. A measuring instrument including a handle provided with a stem, a traction disk rotatably secured to the end of the stem, a plurality of spaced projections extending from one face of said disk, a bell crank lever pivotally secured to said stem and engageable with said projections, a hook formed on said lever, a casing carried by said stem, a spring supported in said casing and having one end connected to said hook and the opposite end fastened to said stem, a recording instrument mounted on the stem, and an operative driving connection between said lever and instrument.

In testimony whereof I affix my signature in presence of two witnesses.

ALFRED K. WASHBURN.

Witnesses:
DAVID J. BARRY,
DANIEL J. DWYER.

Copies of this patent may be obtained for five cents each, by addressing the "Commissioner of Patents, Washington, D. C."